Patented Apr. 24, 1951

2,550,442

UNITED STATES PATENT OFFICE 2,550,442

PREPARATION AND USE OF SYNTHESIS CATALYSTS

Roland A. Beck, Glenham, and Eugene E. Sensel and Alfred J. Millendorf, Beacon, N. Y., assignors to The Texas Company, New York, N. Y., a corporation of Delaware No Drawing. Application January 4, 1946, Serial No. 639,166

2 Claims. (Cl. 260—449.6)

The invention relates to the preparation of, and use of, an improved synthesis catalyst of the supported type containing a metal such as cobalt or nickel for the conversion of carbon monoxide and hydrogen into hydrocarbons, oxygenated hydrocarbons and the like.

In accordance with the invention, the catalyst comprises a metal such as cobalt in association with a supporting material and promoters, and is substantially free from alkali metal compounds. In preparing the catalyst, the metallic constituents are precipitated in the form of insoluble compounds from a solution of soluble salts of these constituents, in the presence of the supporting material, by the action of an alkaline compound of ammonia. The resulting precipitate comprises the insoluble salts of the metallic constituents admixed with supporting material and is subsequently treated with hydrogen at an elevated temperature so as to effect at least partial reduction of the metallic compounds to the metallic state.

The resulting catalyst can be employed for the catalytic treatment of carbon monoxide and hydrogen at elevated temperatures and, if desired, elevated pressure, for the production of hydrocarbons, oxygenated hydrocarbons and the like as will be described more fully.

The usual composition of a supported catalyst used for the hydrogenation of carbon monoxide may be represented as follows: 20 to 50% of a metal of the iron group such as iron, cobalt or nickel; 45 to 75% of a supporting material such as Filter Cel or alumina; and 1 to 10% of promoters such as magnesia and thoria. A mixture of two metals of the iron group may constitute the 20 to 50% of hydrogenating metal present in the supported catalyst rather than one metal alone.

The preparation of supported metal catalysts usually involves the precipitation of the metallic constituents from a solution of their soluble salts such as nitrates by means of sodium or potassium carbonate. The usual mode of preparation is to dissolve the appropriate quantities of salts of the element of the iron group and of the promoters in an aqueous slurry of the insoluble supporting material. After thorough mixing of the slurry wherein the soluble salts of the iron group element of the promoters are dissolved, the metallic constituents are precipitated by addition of or treatment with an alkaline solution such as sodium carbonate. After filtration of the precipitate and drying, the element of the iron group which is present as an insoluble compound is reduced partially or completely to the metallic state by treatment with hydrogen at an elevated temperature.

It has been proposed heretofore to employ synthesis catalysts of the supported type containing compounds of an alkali metal. Moreover it is possible that the presence of small quantities of alkali metals are beneficial with certain iron catalysts of the unsupported type.

Notwithstanding the teaching of the prior art, we have discovered that the presence of even small quantities of compounds of alkali metals in supported cobalt and nickel catalysts is deleterious. Better yields and catalyst life are obtained when this type of catalyst is substantially free from alkali metal compounds.

Moreover it appears that an alkali metal compound such as sodium carbonate is substantially occluded by the precipitated salts formed during catalyst preparation. This is particularly true in the case of cobalt catalysts and the complete removal of the alkali metal compound from the carbonate by washing is difficult. Furthermore, the repeated washings necessary to remove the alkali metal compounds result in considerable loss of some of the more soluble promoters such as compounds of thorium.

This invention affords a solution to the problem posed by the discovery of the harmful effect of small quantities of alkali on supported carbon monoxide-hydrogenation catalysts. Alkaline compounds of ammonia, such as ammonium carbonate or ammonium hydroxide are used to effect the precipitation of the metallic constituents from the slurry of the supporting material wherein they are present in the form of their soluble salts. Ammonium carbonate and ammonium hydroxide effect the precipitation of the metallic constituents in the form of insoluble carbonates or insoluble hydroxides respectively. For example, in a catalysts which comprises cobalt as the hydrogenating metal, Filter Cel as the supporting material and alumina and thoria as promoters, the cobalt, aluminum and thorium would be precipitated by ammonium carbonate as their insoluble carbonates from a solution of their soluble nitrates.

During reduction of the catalyst with hydrogen at a temperature of about 500 to 800° F., the occluded excess ammonium carbonate is decomposed into gaseous components which are removed from the catalyst by the reducing stream of hydrogen. The decomposition of ammonium carbonate and ammonium hydroxide into gaseous components which are readily removed from the catalyst is represented by the following equations:

$$(NH_4)_2CO_3 \rightarrow 2NH_3 + H_2O + CO_2$$
$$NH_4OH \rightarrow NH_3 + H_2O$$

The employment of ammonium carbonate or ammonium hydroxide to effect the precipitation of the metallic constituents prior to the reduction eliminates the necessity of a plurality of washings to effect the removal of the alkali metal and prevents the possible loss of soluble promoters such as compounds of thorium. Of greater importance is the fact that a catalyst which is prepared by the use of ammonium carbonate gives about 20% better yields of liquid hydrocarbon products than does a catalyst prepared using sodium carbonate even though adequate provision is made to remove thoroughly the excess alkali metal by repeated washings.

The following examples compare the method of preparation of this invention with the conventional procedure of supported catalyst preparation and contrast the yields obtained using catalysts prepared according to the two different procedures under similar conditions. Example I illustrates the conventional procedure for the preparation of a supported catalyst with the hydrogenation of carbon monoxide and indicates the yield obtained using such a catalyst under optimum operating conditions which are detailed. Example II illustrates the method of preparation as disclosed in this invention and cites the yield obtained using this method under similar conversion conditions as are employed in Example I.

*Example I*

1975 grams of cobalt nitrate, $Co(NO_3)_2 \cdot 6H_2O$, 26.1 grams of thorium nitrate, $Th(NO_3)_4 \cdot 4H_2O$, 238.5 grams of magnesium nitrate, $$Mg(NO_3)_2 \cdot 6H_2O$$

and 869 grams of Filter Cel were added to five liters of water and stirred for 30 minutes to effect complete solution of the nitrates of the various metals. The metallic constituents were precipitated by the addition of sufficient 10% solution of sodium carbonate. The precipitate was filtered and washed 10 times by slurrying with five-liter portions of water in each washing. The filtered material was then dried at 250° F. until a separate sample heated at 1000° F. showed a total loss of 20% by weight. The material was ground to 40 mesh and then pelleted in ⅛ inch dies.

The ⅛ inch pellets of the catalyst were placed in a reactor and reduced with pure hydrogen at a space velocity (volume of gas measured at 60° F. and atmospheric pressure per volume of catalyst per hour) of 100. The duration of the hydrogen treatment was 24 hours and it was conducted at a temperature of about 660° F. After this reduction treatment, the reduced catalyst then had the following composition:

| | Per cent by weight |
|---|---|
| Co | 34.3 |
| MgO | 2.1 |
| ThO₂ | 0.5 |
| Filter Cel | 62.8 |
| Na₂CO₃ | 0.3 |

Catalyst of the above composition was conditioned by treating with synthesis gas starting at about 300° F. and by raising the temperature uniformly over a period of about 6 hours to the temperature at which the catalytic conversion of hydrogen and carbon monoxide into hydrocarbons occurred.

Synthesis gas containing carbon monoxide and hydrogen in the molecular ratio of 1:2 was passed at atmospheric pressure through the catalyst bed at a space velocity of 100 and at a temperature of about 392° F. A fixed-bed operation was employed for the catalytic conversion without recycle of tail gas. A yield of 135 grams of debutanized liquid hydrocarbons per cubic meter of synthesis gas was obtained as a result of catalytic conversion conducted in this manner.

*Example II*

1975 grams of cobalt nitrate, $Co(NO_3)_2 \cdot 6H_2O$, 26.1 grams of thorium nitrate, $Th(NO_3)_4 \cdot 4H_2O$, 238.5 grams of magnesium nitrate, $$Mg(NO_3)_2 \cdot 6H_2O$$

and 869 grams of Filter Cel were added to five liters of water and stirred for 30 minutes to effect complete solution of the nitrates of various metals. The metallic constituents were precipitated by the addition of sufficient 10% solution of ammonium carbonate. The precipitate was filtered and washed once by slurrying with a five-liter portion of water. The filtered material was then dried at 250° F. until a separate sample heated at about 1000° F. showed a total loss of 20% by weight. The material was ground to 40 mesh and then pelleted in ⅛ inch dies.

The ⅛ inch pellets of the catalyst were placed in a reactor and reduced with pure hydrogen at a space velocity of 100. The duration of the hydrogen treatment was 24 hours and it was conducted at a temperature of about 660° F. After this reduction treatment, the reduced catalyst then had the following composition:

| | Per cent by weight |
|---|---|
| Co | 32.0 |
| MgO | 3.0 |
| ThO₂ | 1.0 |
| Filter Cel | 64.0 |

Catalyst of the above composition was conditioned by treating with synthesis gas starting at about 300° F. and by raising the temperature uniformly over a period of about 6 hours to the temperature at which the catalytic conversion of hydrogen and carbon monoxide into hydrocarbons occurred.

Synthesis gas containing carbon monoxide and hydrogen in the molecular ratio of 1:2 was passed at atmospheric pressure through the catalyst bed at a space velocity of 100 and at a temperature of 392° F. A fixed-bed operation was employed for the catalytic conversion without recycle of tail gas. A yield of 161 grams of debutanized liquid hydrocarbons per cubic meter of synthesis gas was obtained as a result of catalytic conversion conducted in this manner.

The invention is particularly concerned with the preparation and use of cobalt catalysts of the supported type. It is contemplated that it may also have application to synthesis catalysts containing other metals of the group VIII of the periodic system.

From a comparison of the compositions of the above catalysts, it can be noted that there is a greater percentage of promoters in the catalyst prepared using ammonium carbonate as a precipitant. This discrepancy in the compositions is not sufficient to account for the improved results obtained using the catalyst prepared as disclosed in this invention. For example, there is 1% of thoria in the ammonium carbonate precipitated catalyst and 0.5% in the sodium carbonate precipitated catalyst. The difference in the final compositions is effected by the elimination of the plurality of washings in the method of preparation as disclosed in this invention. The plurality of washings, usually about 10 in number, dissolves a considerable portion of the promoters from the catalyst. The difference in the compositions of the catalyst highlights one of the advantages of the preparation via ammonium carbonate as a precipitant, namely, that promoters such as thoria are not lost.

Ammonium hydroxide or a gaseous mixture of ammonia and carbon dioxide may also be used to effect the precipitation of the metal carbonates but ammonium carbonate is the preferred precipitant.

The method of preparation as disclosed in this invention is adaptable to the preparation of supported catalysts whose composition is of the following order: 20 to 50% of an element of the eighth group such as cobalt, 45 to 75% of a supporting material such as Filter Cel and 2 to 10% promoters such as magnesia and thoria. The catalyst after preparation may be pelleted for use in fixed-bed type of catalytic conversion or it may be ground so as to effect a particle size distribution which is advantageous for the employment of the fluidized bed type of catalytic conversion.

The duration of hydrogen treatment whereby the metal of the eighth group is substantially reduced to the metallic state is preferably in the range of 20 to 24 hours but may vary from 12 to 30 hours. Temperatures in the range of 600 to 800° F. may be used during this hydrogen treatment but the preferred temperature range is 650 to 700° F. Space velocities of 75 to 300 may be employed but the preferred space velocity is about 100.

In the hydrogenation of carbon monoxide to form hydrocarbons or oxygenated hydrocarbons using the catalyst prepared according to the method of this invention, a reaction temperature from 325 to 650° F. may be employed depending upon the type of operation and the hydrogenating metal employed. Thus, for example, the preferred temperature range for a cobalt catalyst prepared according to the method of this invention is 375 to 410° F. using a fixed-bed type of catalytic conversion.

It is possible to direct the catalytic conversion using the disclosed catalyst toward the formation of oxygenated products employing elevated pressures, for example, in the range of 250 to 5000 pounds per square inch. In general, pressures ranging from atmospheric to 1000 pounds per square inch may be used in the hydrogenation of carbon monoxide to the desired products.

Obviously many modifications and variations of the invention, as hereinbefore set forth, may be made without departing from the spirit and scope thereof, and therefore only such limitations should be imposed as are indicated in the appended claims.

We claim:

1. In the hydrogenation of carbon monoxide to produce hydrocarbons, oxygenated hydrocarbons and the like, the method which comprises maintaining in a reaction zone a catalyst prepared by forming a solution of nitrates of cobalt, magnesium and thorium, said solution containing a supporting material; treating said solution with ammonium carbonate so as to form a precipitate comprising metal carbonates deposited on said supporting material; removing excess water from said precipitate; drying said precipitate; reducing said precipitate with hydrogen at a temperature within the range of 650 to 700° F. to form an active solid catalyst; passing carbon monoxide and hydrogen into contact with the resulting fresh catalyst prior to any use in the synthesis of hydrocarbons, at a temperature of approximately 300° F., and gradually increasing the temperature of the carbon monoxide and hydrogen passed into contact with the catalyst over a period of about six hours to a temperature at which conversion of the carbon monoxide and hydrogen into desired compounds occurs.

2. In the hydrogenation of carbon monoxide to produce hydrocarbons, oxygenated hydrocarbons, and the like, the improvement which comprises contacting hydrogen and carbon monoxide in a reaction zone with a catalyst prepared by forming an aqueous solution of a nitrate of a metal selected from the group consisting of cobalt and nickel, said solution containing a solid supporting material and promoters, treating said solution with an alkaline compound of ammonia to form a precipitate of said metal and promoters on said supporting materials, removing excess water from said precipitate, drying said precipitate, reducing said precipitate with hydrogen at a temperature within the range of from about 650 to about 700° F., passing carbon monoxide and hydrogen into contact with the resulting fresh catalyst prior to any use in the synthesis of hydrocarbons, at a temperature not above 300° F., and gradually increasing the temperature of said carbon monoxide and hydrogen to a temperature at which the carbon monoxide and hydrogen are converted into the desired compounds.

ROLAND A. BECK.
EUGENE E. SENSEL.
ALFRED J. MILLENDORF.

REFERENCES CITED

The following references are of record in the file of this patent:

UNITED STATES PATENTS

| Number | Name | Date |
|---|---|---|
| 2,127,127 | Martin et al. | Aug. 16, 1938 |
| 2,219,042 | Heckel et al. | Oct. 22, 1940 |
| 2,347,682 | Gunness | May 2, 1944 |
| 2,360,787 | Murphree et al. | Oct. 17, 1944 |
| 2,445,795 | Millendorf | July 27, 1948 |

OTHER REFERENCES

"Brennstoff-Chemie," vol. 13, pages 61–63 (1932).